United States Patent [19]

Giovannetti

[11] 4,345,403

[45] Aug. 24, 1982

[54] METHOD OF PRODUCING PLANTS MYCORRHYZATED WITH SYMBIOTIC FUNGI

[75] Inventor: Giusto Giovannetti, Turin, Italy

[73] Assignee: Pegasus Pension Fund S.A., Panama City, Panama

[21] Appl. No.: 232,876

[22] Filed: Feb. 9, 1981

[30] Foreign Application Priority Data

Feb. 18, 1980 [IT] Italy ............................... 67244 A/80

[51] Int. Cl.$^3$ .............................................. A01G 1/04
[52] U.S. Cl. .......................................... 47/1.1; 47/58
[58] Field of Search ...................................... 47/1.1, 58

[56] References Cited

FOREIGN PATENT DOCUMENTS

| 2900474 | 7/1980 | Fed. Rep. of Germany | 47/1.1 |
|---|---|---|---|
| 1408517 | 7/1964 | France . | |
| 1408517 | 7/1965 | France | 47/1.1 |
| 55-3718 | 1/1980 | Japan | 47/1.1 |
| 55-104824 | 8/1980 | Japan | 47/1.1 |
| 55-104825 | 8/1980 | Japan | 47/1.1 |

OTHER PUBLICATIONS

The Biology & Cultivation of Edible Mushrooms, Chang & Hayes, 1978, Academic Press, N.Y., pp. 645–681.

*Primary Examiner*—Robert E. Bagwill
*Attorney, Agent, or Firm*—Sandler & Greenblum

[57] ABSTRACT

The invention relates to a method of producing plants mycorrhyzated (i.e. having their roots associated) with symbiotic fungi, so as to apply mycorrhyzation to already adult plants and obtain mycorrhyzated plants which can produce fruit-bearing bodies immediately after being planted.

The method consists in cultivating a set of young plants in sterile soil, preferably starting from seed, and in mycorrhyzating the young plants grown in sterile conditions, by placing their roots in contact with roots previously mycorrhyzated with the desired fungus and obtained under natural conditions from other plants. The resulting pilot young plants are planted in a sterile greenhouse or sterile nursery, in which already adult plants are subsequently planted so as to be mycorrhyzated, after secondary roots have first been eliminated and the remaining roots have been sterilized. The pilot young plants mycorrhyzate the adult plants with the desired fungus, so that the plants can immediately produce fruit-bearing bodies.

9 Claims, No Drawings

METHOD OF PRODUCING PLANTS MYCORRHYZATED WITH SYMBIOTIC FUNGI

The present invention relates to a method of producing plants mycorrhyzated (i.e. having their roots associated) with symbiotic fungi of use in commerce or forestry, e.g. *Tuber magnatum* (white truffle), *Tuber macrosporum* (black truffle), *Tuber melanosporum* (black Norcia truffle), *Boletus edulis, Boltetus reticulatus, Boletus aereus, Boletus pinicola, Amantia Caersarea,* and *Lattarius deliciosus.*

It has already been proposed to mycorrhyzate various kinds of plants with tubers which are important as food, e.g. *Tuber melanosporum*, starting from the seed of the plant which is to be mycorrhyzated. The method has been described by Anna Fontana and Bruno Fassi in the periodical "*Allionia*" for 1967 and comprises a step in which seeds of the plants to be mycorrhyzated are sterilized, a step in which soil is sterilized so that the seeds can be planted in it, and a step in which mature spores of the selected tuber are added. The entire sysitem is kept in phytocells (one plate per phytocell) in a semi-sterile environment for about 8 months. After this period the young plants are ready to be planted permanently.

However, when the aforementioned method is used, it is a long time before the seed-bearing bodies can be harvested. In the case, for example, of *Tuber melanosporum*, the carpophores (seed-bearing bodies) can be harvested after an average of about 10 years, or a minimum of about 4 years in exceptional cases (using stonefruit plants). In addition, the previously-described method cannot be applied to all symbiotic fungi. For example, spores of *Boletus edulis* do not germinate if the aforementioned method is used. It is consequently expensive to produce mycorrhyzated young plants.

An object of the present invention is to provide a method of producing plants mycorrhyzated with symbiotic fungi which makes it possible for already-adult plants to be mycorrhyzated, so as to obtain mycorrhyzated plants which, when finally planted, can rapidly produce fruit-bearing bodies.

The present invention provides a method for producing plants mycorrhyzated (i.e. having their roots associated with) symbiotic fungi, which comprises the following steps:

(a) Cultivating a set of young plants in sterile soil;

(b) Mycorrhyzating the young plants grown under sterile conditions, by placing the roots of the plants in contact with roots previously mycorrhyzated with the desired fungus and taken under natural conditions from other plants;

(c) Planting the resulting pilot young plants in sterile soil;

(d) Cutting secondary roots mycorrhyzated with fungi different from the disired fungus from already adult plants to be mycorrhyzated, and sterilizing the remaining roots; and (e) Mycorrhyzating the said adult plants by planting them in sterile soil among the pilot plants.

As a result of the aforementioned features, the method according to the invention can be used to obtain adult mycorrhyzated plants capable of immediately producing fruit-bearing bodies. There is also a considerable reduction, compared with the prior-art methods, in the cost of producing each mycorrhyzated plant. Finally the method according to the invention can be used for mycorrhyzating plants with any grade of symbiotic fungus (e.g. *Boletus edulis*).

The following is a description of a preferred embodiment of the method according to the invention.

The method comprises a first set of operations for preparing the pilot young plants, which are then used to mycorrhyzate adult plants.

Firstly, the seeds of the plant in question are germinated under serile conditions. When the roots of the plant have grown sufficiently, they are placed in contact, preferably by tying, with roots mycorrhyzated with the desire symbiotic fungus. The last-mentioned roots are taken from other plants under natural conditions, by collecting them under the fruit-bearing bodies of the selected fungus and then screening them under the microscope.

The resulting pilot young plants are permanently planted in sterile soil, e.g. in a sterile greenhouse or sterile nursery.

If a greenhouse is used, it is necessary to prepare a rectangular cement tank having a bottom which inclines slightly (e.g. with a 10% slope) in the width direction for the purpose of harvesting and draining water through a set of pipes in the tank. A bottom layer of gravel for draining the soil is placed in the tank and is covered with a layer of previously-sterilized soil. The greenhouse can have a plastics cover similar to those used in horticultuer. In a practical embodiment, the cement tank was 14 m long, 6 m wide and 60 cm deep. The layer of gravel was 20 cm deep and the sterile earth layer was 30 cm deep.

If a sterile nursery is to be used, a portion of land is chosen and its perimeter is marked out by using thin rubber or plastics walls which are buried so as to prevent water entering the chosen portion of land down to a depth of 1.5 m. The chosen portion of the nursery is then chemically sterilized (e.g. with methyl bromide) and covered with a plastics tunnel.

The pilot young plants are planted in the sterile nursery or sterile greenhouse in autumn. The pilot plants are preferably disposed at a distance of half a meter from one another.

Next, the method comprises a set of operations for preparing the plants which are to be mycorrhyzated. The treatment varies slightly depending on whether the plants being treated are adult and between 2 and 10 years old, or are cuttings or nursery plants. If the plants to be mycorrhyzated are between 2 and 10 years old, they are taken during the period of vegetative rest. All secondary roots mycorrhyzated with fungi different from the desired fungus are mechanically cut off. The remaining roots are then sterilized, e.g. by treating them with a 0.1% mercury chloride solution for 2 hours. Next, the foliage is pruned. The roots are then treated with growth-stimulating hormones. Finally the plant is planted in the greenhouse or nursery together with the pilot young plants, before it resumes vegetative growth.

If the plants to be mycorrhyzated are cuttings, suitable plants are first chosen and then sterilized, e.g. with 0.1% mercury chloride, and then treated with growth-stimulating hormones. Finally the plants are planted before resuming vegetative growth.

If the plants to be mycorrhyzated are young plants from a forest nursery, the cost should be limited by choosing young plants which are between 6 months and a year from the seed. At this stage the young plants have not yet become mycorrhyzated with any fungus. They are sterilized with mercury chloride for an hour and then planted in the greenhouse or sterile nursery. The operation is performed before the resumption of vegetative growth.

In all three cases described, the young plants were mycorrhyzated with the desired symbiotic fungus during the end of autumn, and were therefore ready during autumn to be planted in an open field.

By means of the process according to the invention, mycorrhyzation can be applied to adult plants so as to reduce the time required before harvesting the carpophores. The same method can be used to mycorrhyzate plants with any kind of fungus, though this is impossible with known methods. The result is a considerable reduction in the cost of producing each mycorrhyzated young plant.

I claim:

1. A method for producing plants mycorrhyzated (i.e. having their roots associated) with symbiotic fungi, which comprises the following steps:
   (a) Cultivating a set of young plants in sterile soil;
   (b) Mycorrhyzating said young plants grown under sterile conditions, by placing the roots of said plants in contact with roots previously mycorrhyzated with the desired fungus and taken under natural conditions from other plants;
   (c) Planting the resulting pilot young plants in sterile soil;
   (d) Cutting secondary roots mycorrhyzated witth fungi different from the desired fungus from already adult plants to be mycorrhyzated, and sterilizing remaining roots, and
   (e) Mycorrhyzating said adult plants by planting them in sterile soil among said pilot plants.

2. A method according to claim 1, in which said young plants in sterile soil in step (a) are grown from seed.

3. A method according to claim 1, in which said resulting pilot young plants are planted in a sterile greenhouse.

4. A method according to claim 1, in which said resulting pilot young plants are planted in part of a sterile nursery.

5. A method according to claim 1, in which said pilot plants are planted in autumn.

6. A method according to claim 1, in which said pilot plants are planted at a distance of half a meter from one another.

7. A method according to claim 1, in which remaining roots of said already-adult plants to be mycorrhyzated are sterilized by treating them with a solution of 0.1% mercury chloride.

8. A method according to claim 1, in which remaining roots of said already-adult plants to be mycorrhyzated, after being sterilized, are treated with a growth-stimulating hormone.

9. A method according to claim 8, in which said already-adult plants to be mycorrhyzated, after being treated with hormone, are planted before the resumption of vegetative growth.

* * * * *

UNITED STATES PATENT AND TRADEMARK OFFICE
CERTIFICATE OF CORRECTION

PATENT NO. : 4,345,403

DATED : August 24, 1982

INVENTOR(S) : Giusto GIOVANNETTI

It is certified that error appears in the above-identified patent and that said Letters Patent is hereby corrected as shown below:

On the title page of the patent, in the identification of references cited, the line reading "1408517  7/1964  France" should be deleted.

Column 2, line 9, "serile" should be --sterile--;

line 34, "plastics" should be --plastic--; and line 38, "plastics" should be --plastic--.

Signed and Sealed this

Fifteenth Day of February 1983

[SEAL]

Attest:

GERALD J. MOSSINGHOFF

Attesting Officer

Commissioner of Patents and Trademarks